United States Patent
Wang et al.

(10) Patent No.: US 8,427,412 B2
(45) Date of Patent: Apr. 23, 2013

(54) DISPLAY DEVICE

(75) Inventors: Tsang-Hong Wang, Hsin-Chu (TW);
Yun-Chung Lin, Hsin-Chu (TW);
Sheng-Chao Liu, Hsin-Chu (TW);
Chung-Lung Li, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 835 days.

(21) Appl. No.: 12/551,538

(22) Filed: Aug. 31, 2009

(65) Prior Publication Data
US 2010/0295764 A1 Nov. 25, 2010

(30) Foreign Application Priority Data
May 21, 2009 (TW) ................................ 98116845 A

(51) Int. Cl.
*G09G 3/36* (2006.01)
(52) U.S. Cl.
USPC ............................................................ 345/92
(58) Field of Classification Search ........................ None
See application file for complete search history.

(56) References Cited

U.S. PATENT DOCUMENTS

| | | | |
|---|---|---|---|
| 7,525,525 B2* | 4/2009 | Sato et al. ........................ | 345/82 |
| 2007/0018926 A1* | 1/2007 | Shin et al. ........................ | 345/92 |
| 2007/0188435 A1 | 8/2007 | Wen | |
| 2008/0030830 A1* | 2/2008 | Yamaguchi et al. .......... | 359/245 |
| 2010/0109993 A1* | 5/2010 | Chang .............................. | 345/92 |

FOREIGN PATENT DOCUMENTS

| | | |
|---|---|---|
| JP | 11305681 A | 11/1999 |
| TW | I265467 | 11/2006 |

* cited by examiner

*Primary Examiner* — Joseph Haley
*Assistant Examiner* — Emily Frank
(74) *Attorney, Agent, or Firm* — Winston Hsu; Scott Margo

(57) ABSTRACT

A display device includes a substrate, gate lines, data lines, data signal links, and contact vias. The substrate includes a display region, and a peripheral region surrounding the display region. The gate lines, data lines, data signal links, and contact vias are disposed within the display region of the substrate. The gate lines cross the data lines. Each of the data signal links is disposed between adjacent gate lines. Each of the contact vias is disposed between each of the data signal links and a corresponding data line, such that each of the data signal links is electrically connected with the corresponding data line.

17 Claims, 11 Drawing Sheets

DISPLAY DEVICE

BACKGROUND OF THE INVENTION

1. Field of the Invention

The present invention relates to a display device, and more particularly, to a display device with a thin edge design.

2. Description of the Prior Art

With the prevalence of multimedia application, display devices with higher resolution and wider viewing angles have become the trendy products in related technical fields. The rapid rising demand for high-resolution display panels integrated into portable electronic devices (PED) such as digital camera with resolution higher than QVGA (960×240) has also gradually increased. As far as the process integration for related products is concerned, the display device with a thin edge design may provide wider viewing angles in comparison with that with the same size. Meanwhile, the resolution may remain unaffected.

With reference to FIG. 1, FIG. 1 is a schematic diagram illustrating a conventional display device. As illustrated in FIG. 1, the conventional display device 10 includes a display region 12 and a peripheral region 14 disposed around or surrounding the display region 12. The chip driver 18 is located in or coupled to a chip bonding region 16 of the peripheral region 14, and the conducting lines 20 disposed in the peripheral region 14 may provide driving signals from the chip driver 18 to the pixels of the display region 12. In a high-resolution panel, since there is a huge number of the conducting lines 20 which are configured for electrically connecting the chip driver 18 and the pixels of the display region 12, the peripheral region 14 (i.e. edge) of the display panel 10 must be increased as well. Take an amorphous silicon thin-film transistor liquid crystal display (a-Si TFT LCD) panel with QVGA resolution as an example. In order to accommodating the conducting lines 20 between the chip driver 18 and pixels, a width L of over 2 mm should be reserved on both left and right sides of the display region 12 respectively (as shown in FIG. 1). Obviously, the aforementioned design shows that the edge width of the small-sized display device nowadays still requires to be minimized, such that the demand for the appearance specifications of modern electronic products may be fulfilled.

SUMMARY OF THE INVENTION

One object of the present invention is to provide a display device with a thin edge design so as to increase the applications of display device.

In order to achieve the above-mentioned object, the present invention proposes a display panel. The display device includes a substrate, a plurality of gate lines, a plurality of data lines, a plurality of data signal links and a plurality of contact vias. The substrate has a display region and a peripheral region disposed around or surrounding the display region. The gate lines, data lines, data signal links and contact vias are disposed in the display region of the substrate. Each of the data signal links is disposed between adjacent gate lines respectively; each of the contact vias is disposed between each of the data signal links and a corresponding data line respectively, such that each of the data signal links is electrically connected with the corresponding data line respectively.

The present invention utilizes the data signal links disposed in the display region for electrically connecting the source driver and the data lines, and thus additional external conducting lines are not required to be disposed in the peripheral region for delivering data signal to the external conducting lines. Consequently, the edge area of the display device is minimized, and the demand for the appearance specifications of the display device is met.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be detailed as follows. The preferred embodiments of the present invention are illustrated in the accompanying drawings with numbered elements to elaborate the contents and effects to be achieved.

Figure 1:
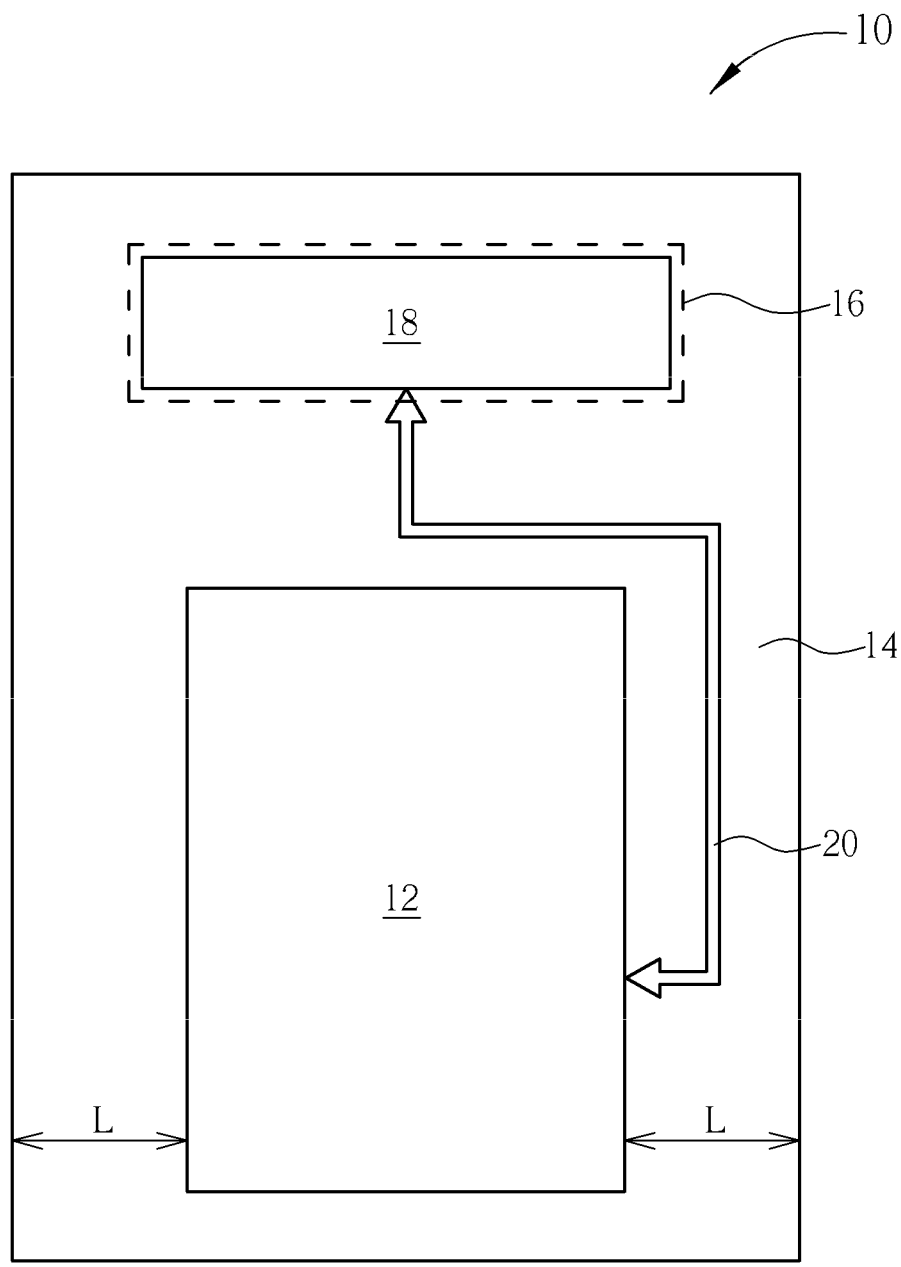
FIG. 1 is a schematic diagram illustrating a conventional display device.
Figure 2:
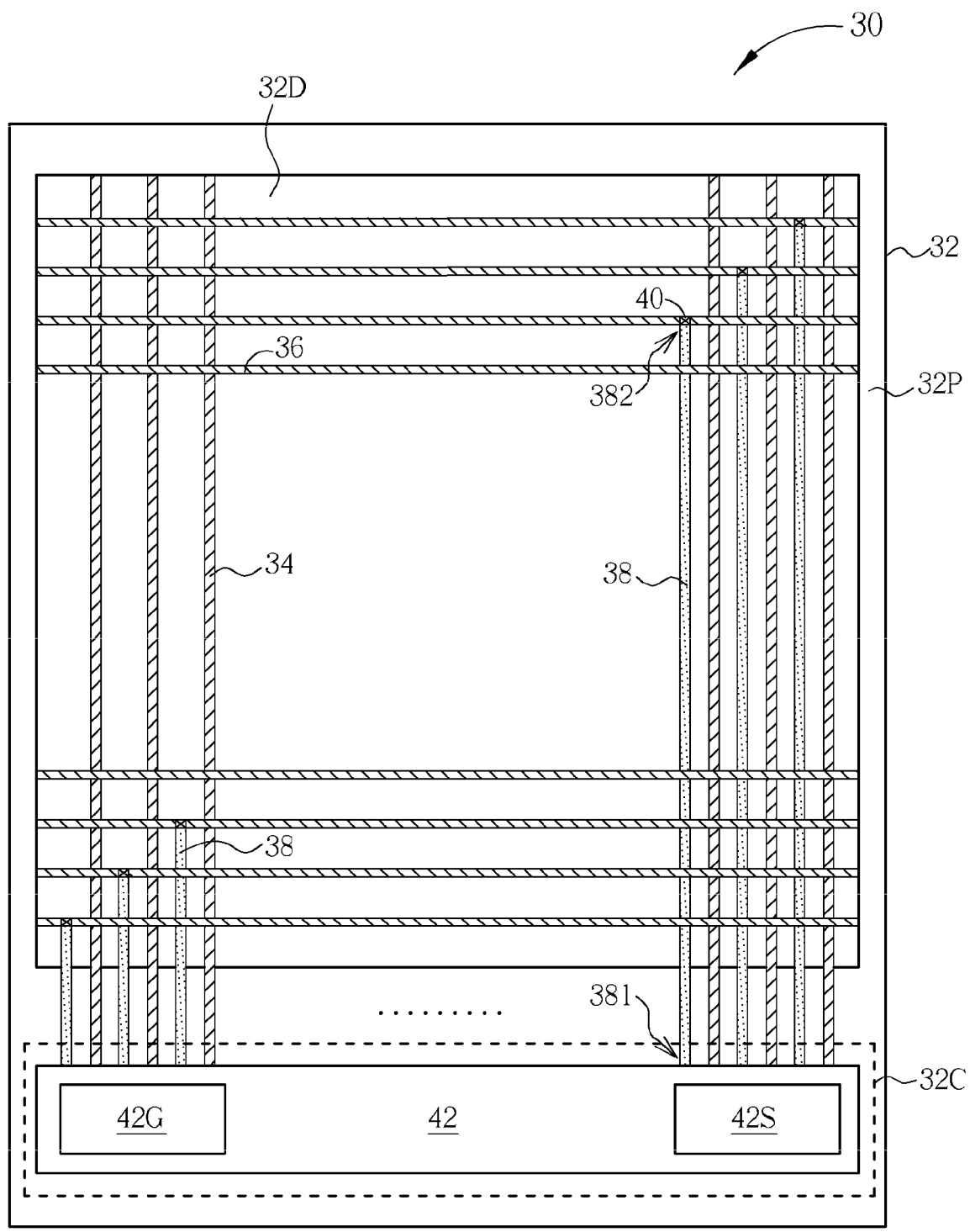
FIG. 2 is a schematic diagram illustrating a display device according to a first preferred embodiment of the present invention.

With reference to FIG. 2, FIG. 2 is a schematic diagram illustrating a display device according to a first preferred embodiment of the present invention. As illustrated in FIG. 2, the display device 30 of this embodiment includes a substrate 32. The substrate 32 includes a display region 32D, a peripheral region 32P disposed around or surrounding the display region 32D, and a chip bonding region 32C disposed in the peripheral region 32P. In this embodiment, the display device 30 may be an LCD device but not limited, and may be one of various types of display devices. The display device 30 includes a plurality of gate lines 34, a plurality of data lines 36, a plurality of data signal links 38 and a plurality of contact vias 40 disposed in the display region 32D of the substrate 32. The gate lines 34 and the data lines 36 are arranged alternately. Each of the data signal links 38 is disposed between the adjacent gate lines 34 respectively. Each of the contact vias 40 is disposed between each of the data signal links 38 and the corresponding data line 36, such that each of the data signal links 38 is electrically connected with the corresponding data line 40 respectively. In addition, the display device 30 further includes at least a gate driver 42 coupled to or in the chip bonding region 32C. The chip driver 42 includes at least a gate driver 42G and at least a source driver 42S coupled to or in the chip bonding region 32C. The gate driver 42G is electrically connected with the gate lines 34 so as to provide the gate lines with gate signals, and the source driver 42S is electrically connected with the data signal links 38 so as to provide the data lines 36 with data signals. In addition, each of the data signal links 38 has a first terminal 381 extending to the chip bonding region 32C and a second terminal 382 electrically connected with each of the corresponding contact vias 40, such that the data signals sending from the source driver 42S will be delivered to the data lines 36 through the data signal links 38 and the contact vias 40. Furthermore, each of the data signal links 38 and the data lines 36 are intersected, and therefore the data signal links 38 and the data lines 36 overlap in the vertical projection direction and intersect with each other to form intersection points. In this embodiment, because the lengths of the data signal links 38 are not identical, each of the data signal links 38 has different number of intersection points with the data lines 36 respectively. If the resolution of the display device 30 is 800×600, the number of the data lines 36 is 2400. Since the lengths of the data signal links 38 are different, each of the data signal links 38 will have different number of intersection points with the data lines 36 respectively. For example, the longest data signal link 38 intersects with two thousand and four hundred data lines 36, two thousand and four hundred intersection points are accordingly generated. Meanwhile, the shortest data signal link 38 only intersects with one data line 36, and therefore only one intersection point is formed and so on.

As illustrated in FIG. 2, in this embodiment, there are no conducting lines disposed in the peripheral region 32P adjacent to the two opposite sides of the display regions 32D, and data signals sending from the source driver 42S disposed in the chip bonding region 32C are delivered to the data lines 36 through the data signal links 38 and the contact vias 40 disposed in the display region 32D. Accordingly, the area of the peripheral region 32P disposed on both sides of the display region 32D is minimized. Also, the display device 30 may satisfy the demand for the display device with a thin edge design and be suitably applied to various kinds of portable electronic devices.

In addition, in the embodiment showed in FIG. 2, a data signal link 38 is disposed between at least parts of the two adjacent gate lines 34 of the display device 30, and the two adjacent data lines 36 are electrically connected with the two adjacent data signal links 38 respectively, whereas the application of the present invention is not limited. Different embodiments of the present invention will be described in the following content. In order to simplify the description and to compare the difference between each of the embodiments of the present invention with ease, identical elements denoted by the same numerals indicate the same devices, and redundant description are no longer detailed.

Figure 3:
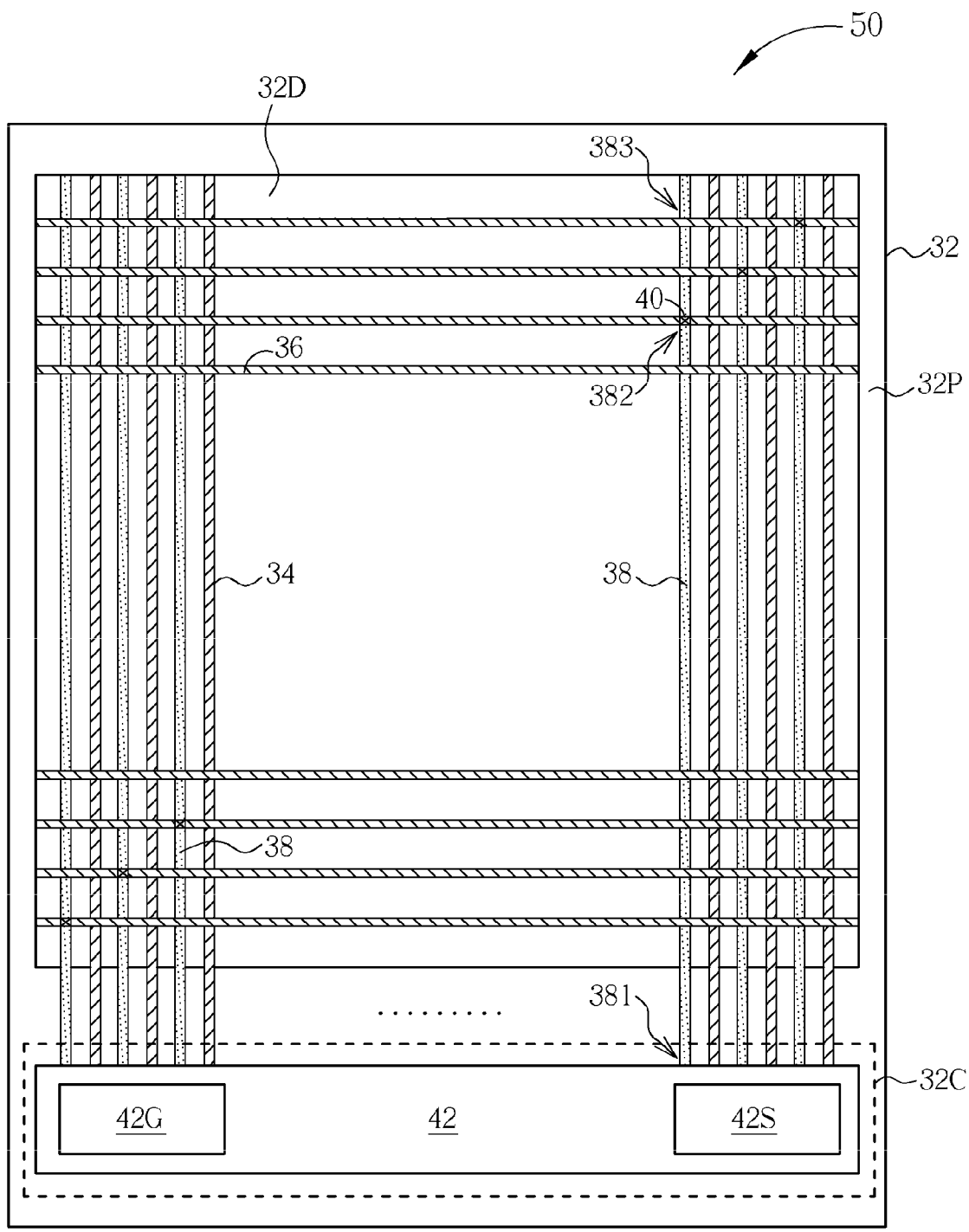
FIG. 3 is a schematic diagram illustrating a display device according to a second preferred embodiment of the present invention.

With reference to FIG. 3, FIG. 3 is a schematic diagram illustrating a display device according to a second preferred embodiment of the present invention. The difference between the second and first preferred embodiments is that each of the data signal links 38 of the display device 50 of this embodiment includes an extension line 383 extending from the second terminal 382 toward the other direction opposite to the chip bonding region 32C, so that the lengths of the data signal links 38 are substantially identical. Since each of the data signal links 38 and the data lines 36 overlap in the vertical projection direction and intersect with each other, and with the arrangement of the extension line 383, each of the data signal links 38 will respectively have the same number of intersection points with the data lines 36 as shown in FIG. 3. Also, loading effect occurs at the intersection point of the data signal links 38 and the data line 36. Since each of the data signal links 38 respectively has the same number of intersection points with the data lines 36, each of the data signal links 38 may accordingly have identical loading effect. In such a case, the display device 50 has equalized loading effect and therefore the display quality is unaffected.

Figure 4:
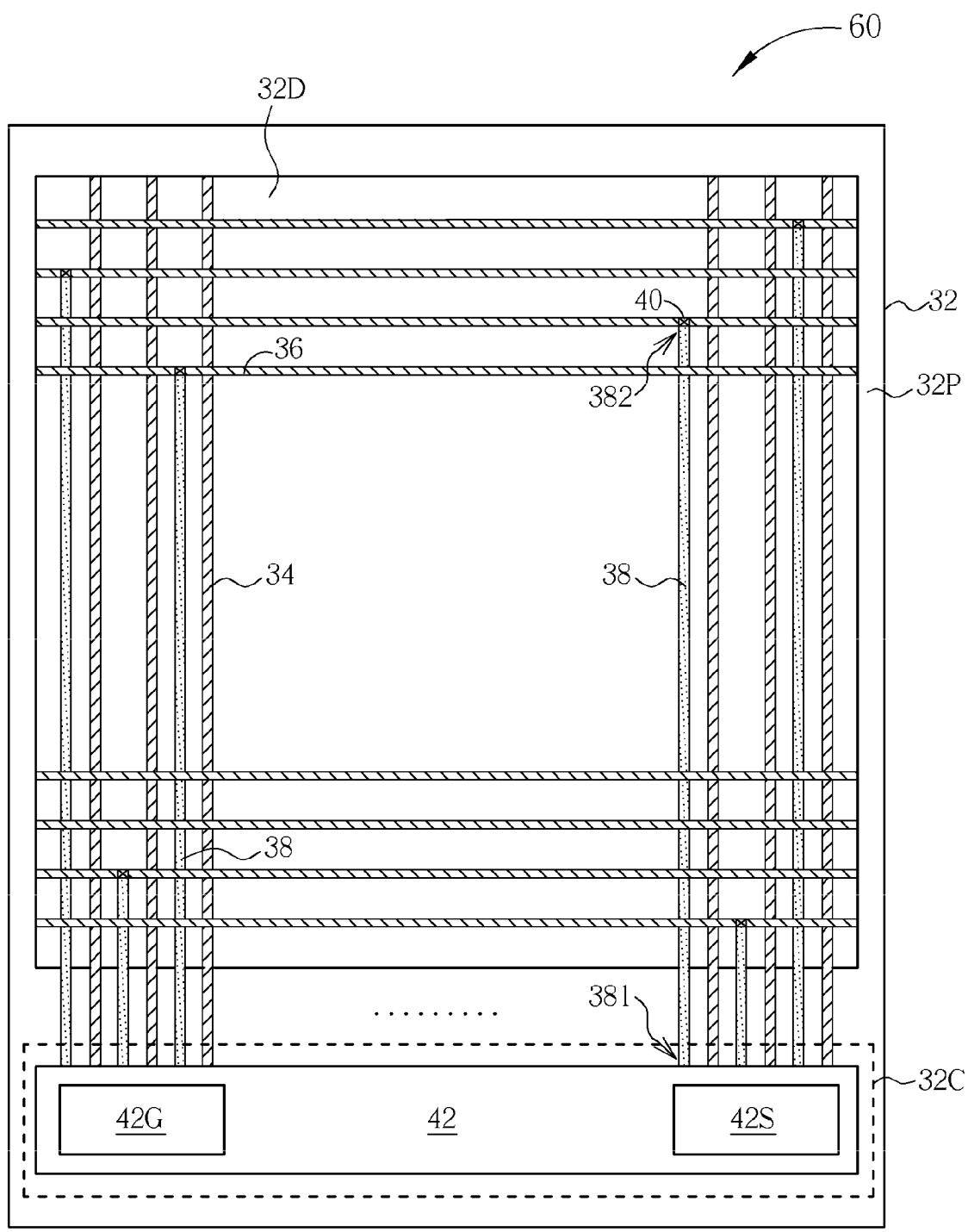
FIG. 4 is a schematic diagram illustrating a display device according to a third preferred embodiment of the present invention.

With reference to FIG. 4, FIG. 4 is a schematic diagram illustrating a display device according to a third preferred embodiment of the present invention. As illustrated in FIG. 4, in this embodiment, each of the data signal links 38 and the data lines 36 of the display device 60 are intersected. Because the lengths of each of the data signal links 38 are different, each of the data signal links 38 has different intersection points with the data lines 36 respectively. The difference between the third and first preferred embodiments is that the two adjacent data lines 36 are electrically connected with the two non-adjacent data signal links 38. For example, the lengths of the data signal links 38 in this embodiment are different, and a long data signal links 38 and a short data signal links 38 are arranged alternately, but not limited. The arrangement of the contact vias 40 may be adjusted depending on its impact on the overall loading effect of the display device 60. By virtue of aforementioned arrangement, the display device 60 with a thin edge design may be achieved, and an equalized loading effect may be obtained.

Figure 5:
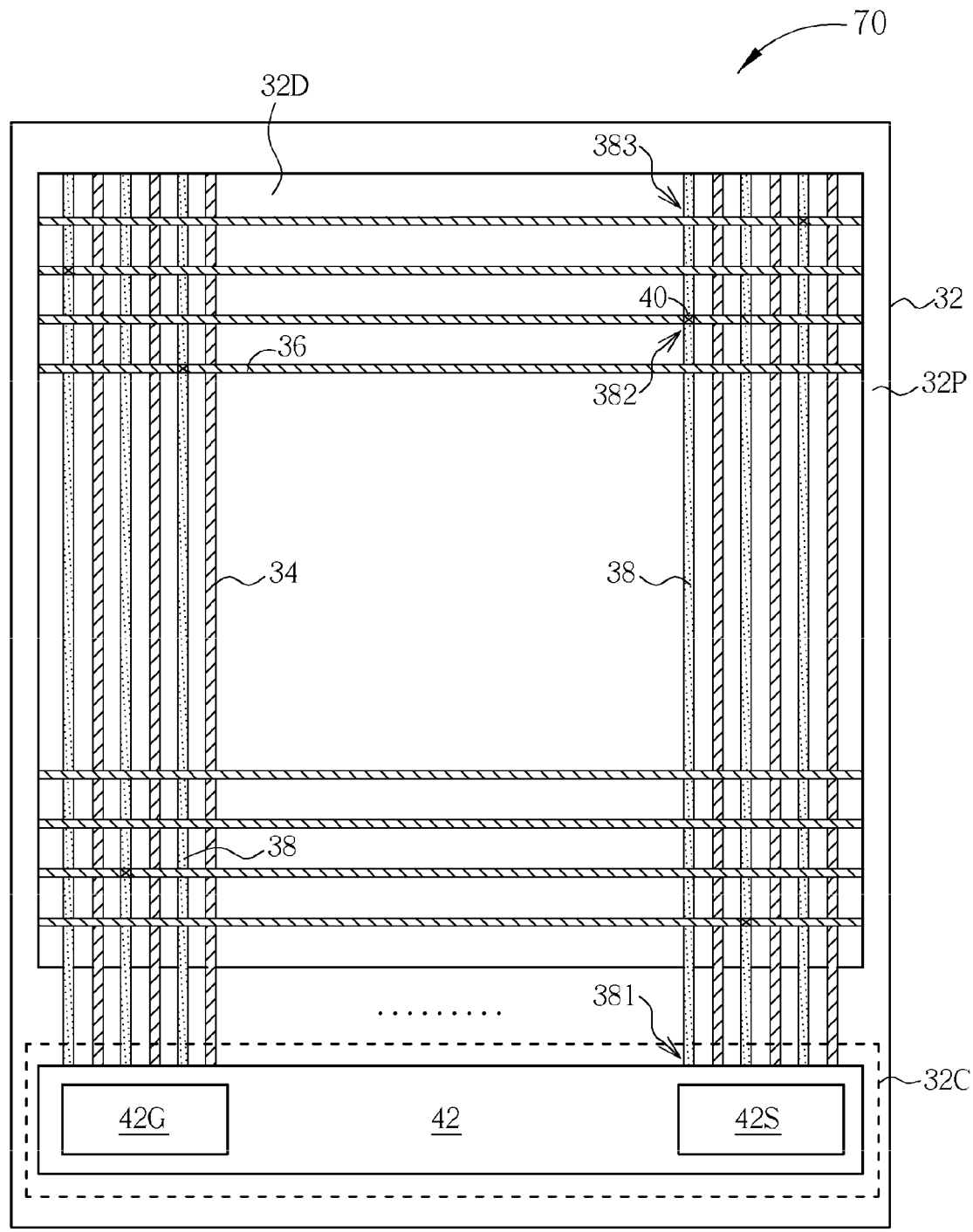
FIG. 5 is a schematic diagram of a display device according to a fourth preferred embodiment of the present invention.

With reference to FIG. 5, FIG. 5 is a schematic diagram of a display device according to a fourth preferred embodiment of the present invention. As illustrated in FIG. 5, the two adjacent data lines 36 of the display device 70 in this embodiment are electrically connected with the two non-adjacent data signal links 38 respectively. The difference between the fourth and third preferred embodiments is that each of the data signal links 38 of the display device 70 in this embodiment includes an extension line 383 extending from the second terminal 382 toward the other direction opposite to the chip bonding region 32C, such that the lengths of the data signal links 38 are substantially identical. With the arrangement of the extending line 383, each of the data signal links 38 has the same number of intersection points with the data lines 36.

Figure 6:
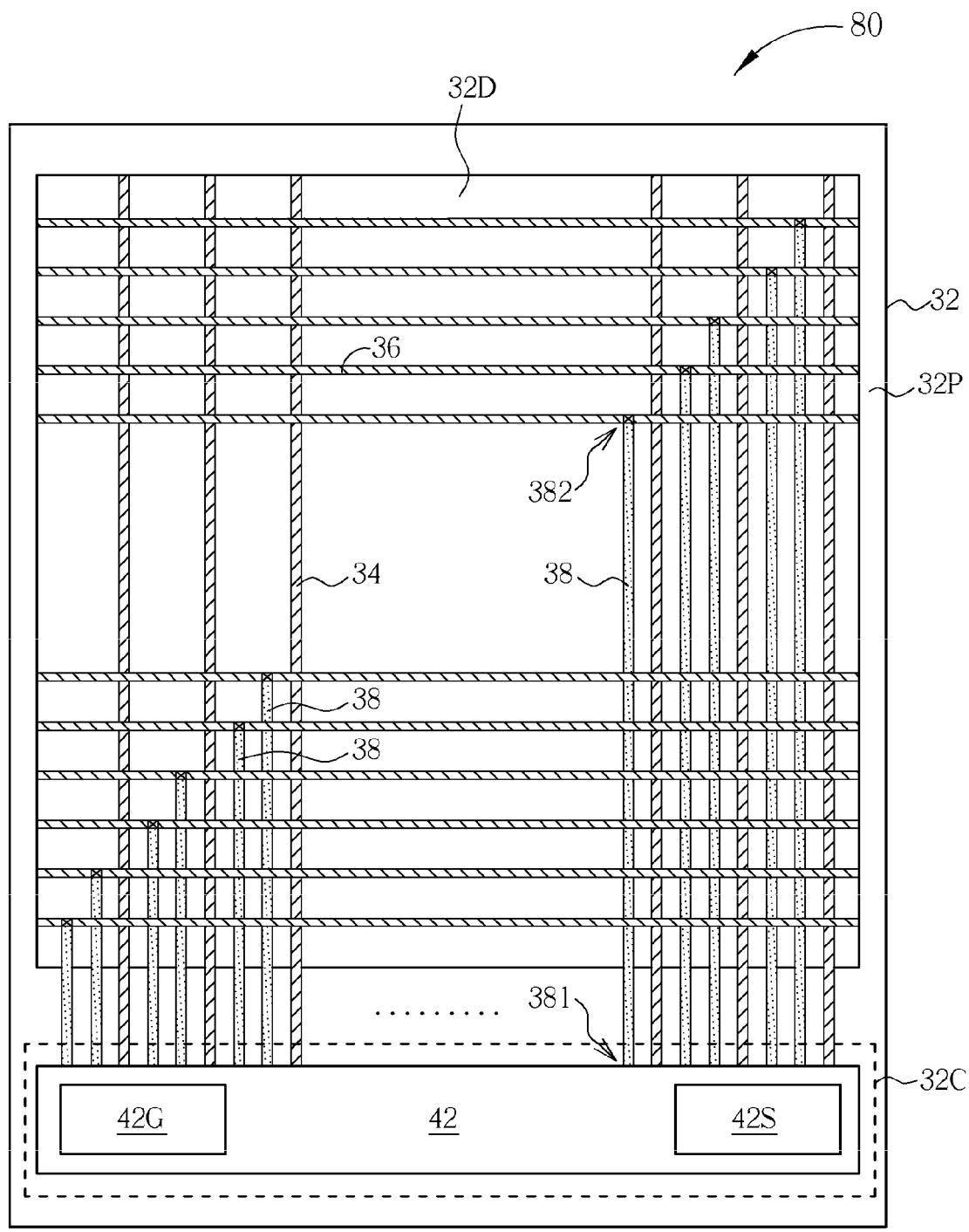
FIG. 6 is a schematic diagram illustrating a display device according to a fifth preferred embodiment of the present invention.

With reference to FIG. 6, FIG. 6 is a schematic diagram illustrating a display device according to a fifth preferred embodiment of the present invention. In some certain specifications of resolution, the number of the gate lines 34 does not match that of the data signal links 38 probably. Precisely speaking, the number of the data signal links 38 is more than that of the gate lines 34. In such a case, the space between the adjacent gate lines 34 is not sufficient for accommodation of all the data signal links 38. As illustrated in FIG. 6, a plurality of data signal links 38, instead of only a data signal link 38, may be disposed between at least parts of the two adjacent gate lines 34 of the display device 80 in this embodiment. In addition, in this embodiment, the lengths of each of the data signal links 38 of the display device 80 are different, and therefore each of the data signal links 38 has different number of intersection points with the data lines 36.

Figure 7:
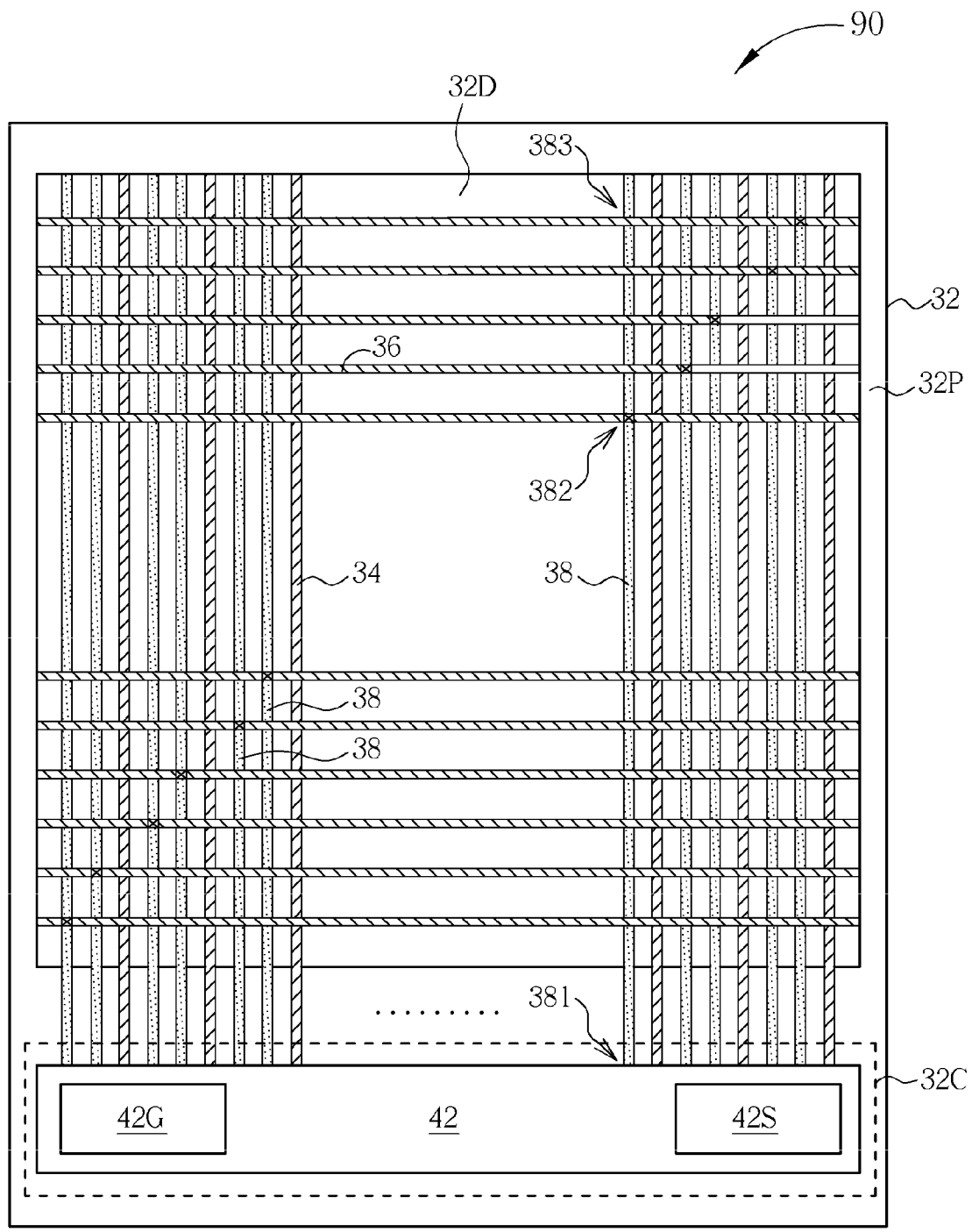
FIG. 7 is a schematic diagram illustrating a display device according to a sixth preferred embodiment of the present invention.

With reference to FIG. 7, FIG. 7 is a schematic diagram illustrating a display device according to a sixth preferred embodiment of the present invention. As illustrated in FIG. 7, a plurality of data signal links 38, instead of only a data signal link 38, are disposed between at least parts of the two adjacent gate lines 34 of the display device 90 in this embodiment. In addition, in this embodiment, each of the data signal links 38 of the display device 90 includes an extension line 383 extending from the second terminal 382 toward the other direction opposite to the chip bonding region 32C, such that the lengths of the data signal links 38 are substantially identical. In addition, each of the data signal links 38 and the data lines 36 are intersected. By virtue of the arrangement of the extension line 383, each of the data signal links 38 has the same number of intersection points with the data lines 36.

Figure 8:
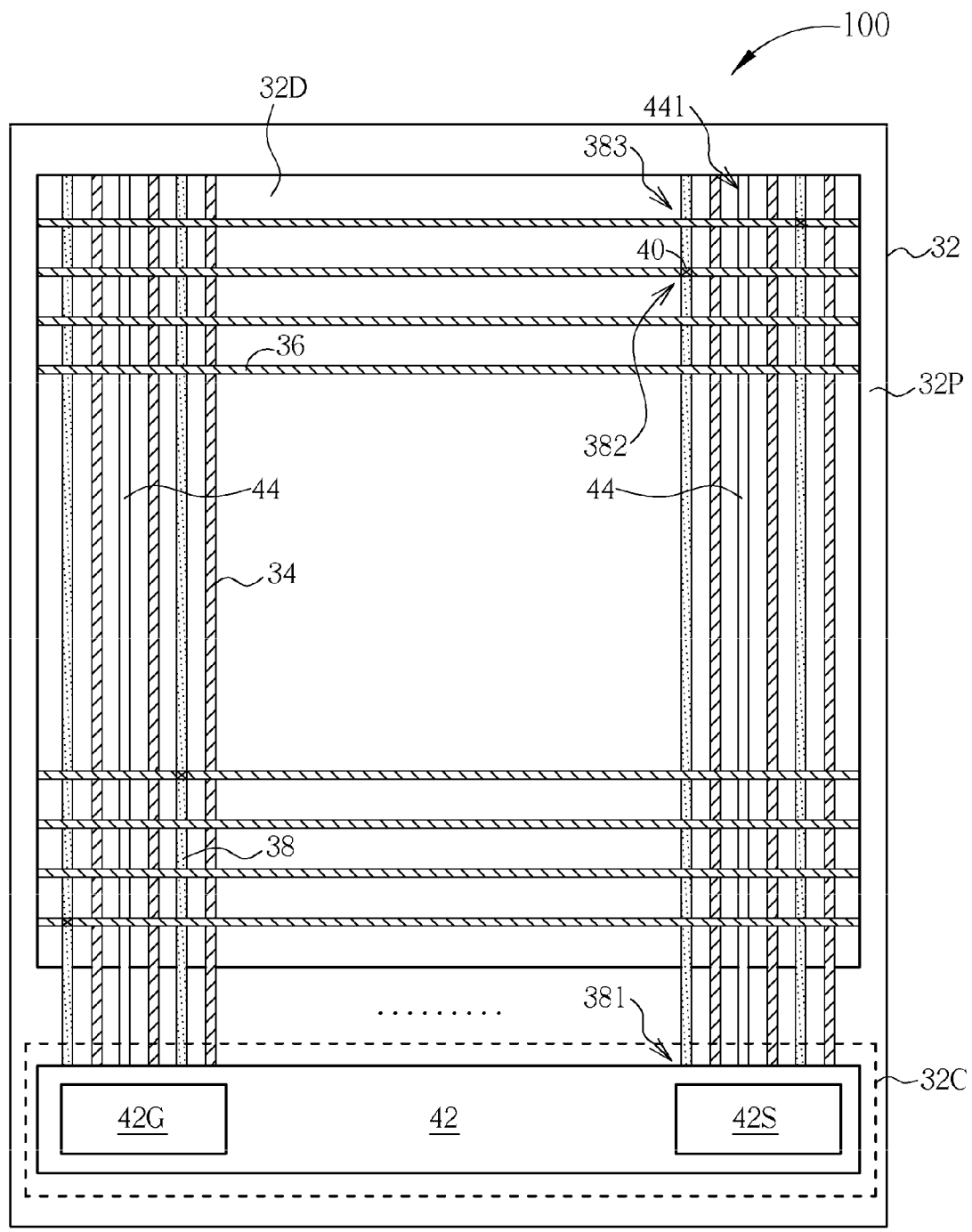
FIG. 8 is a schematic diagram illustrating a seventh preferred embodiment of a display device of the present invention.

With reference to FIG. 8, FIG. 8 is a schematic diagram illustrating a seventh preferred embodiment of a display device of the present invention. In certain specifications of resolution, the number of the gate lines 34 does not match the number of the data signal links 38 probably. Precisely speaking, the number of the gate lines 34 may be more than that of the data signal links 38. It is therefore that the data signal links 38 are not disposed between all of the adjacent gate lines 34, and such non-uniform spatial arrangement may influence the overall loading effect of the display device. In view of this, the display device 100 of this embodiment further includes a plurality of dummy data signal links 44 disposed in the display region 32D of the substrate 32, and the dummy data signal links 44 and the data signal links 38 are substantially parallel to each other. The dummy data signal links 44 are electrically disconnected with any data lines 36. However, since the dummy data signal links 44 and the data lines 36 are intersected and the dummy data signal links 44 may receive the data signals sending from the source driver 42S, the dummy data signal links 44 may have the loading effect similar to the loading effect of the data signal links 38 so as to render the display device 100 equalized loading effect. In addition, the dummy data signal links 44 may further include an extension line 441, just as the data signal links 38 may include an extension line 383, such that the display device 100 may have more equalized loading effect. Moreover, the arrangement of the dummy data signal links 44 and the data signal links 38 are not limited. For example, the dummy data signal links 44 and the data signal links 38 may be respectively disposed on the two opposite sides of the display region 32D or alternately.

Figure 9:
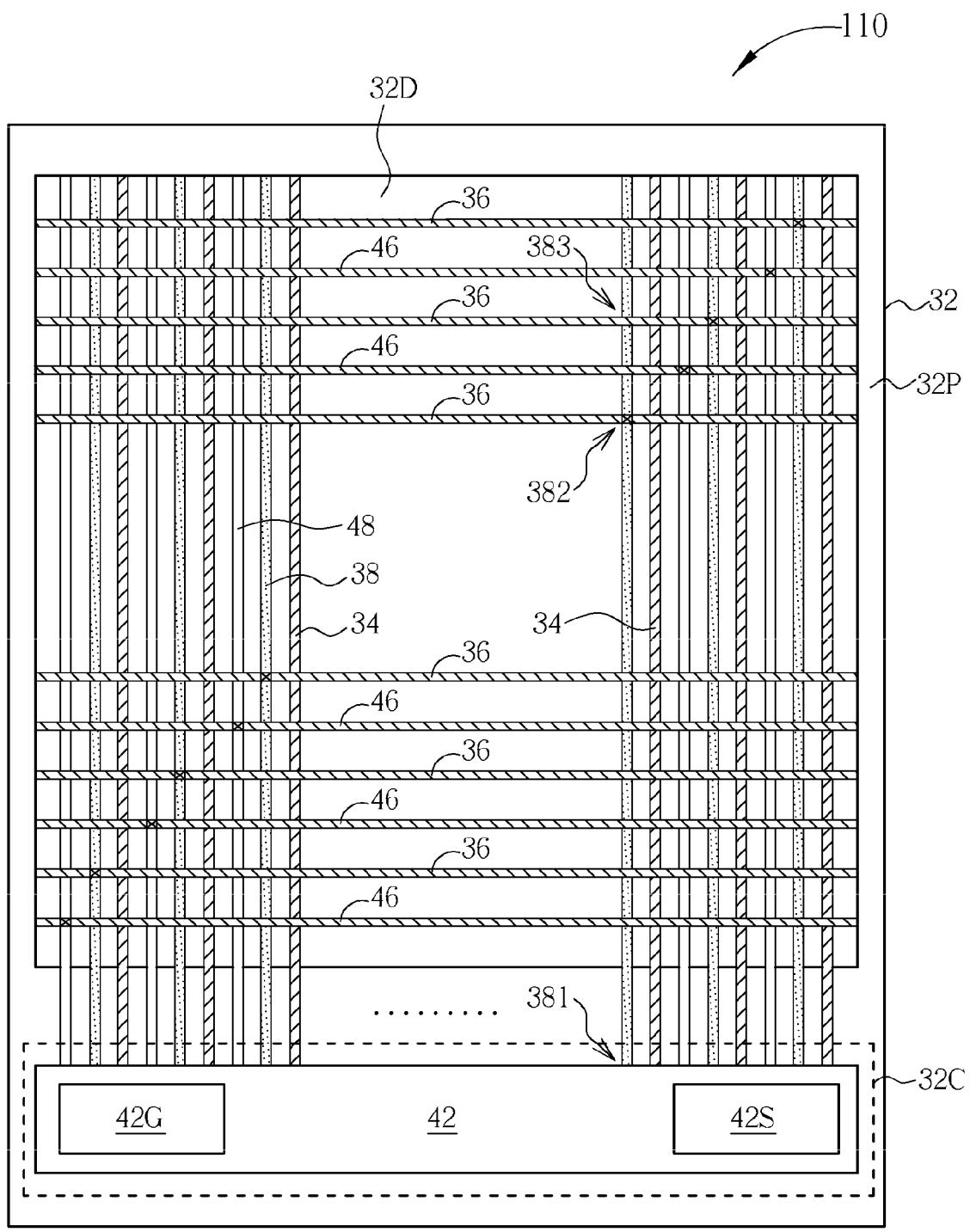
FIG. 9 is a schematic diagram illustrating a display device according to an eighth preferred embodiment of the present invention.

With reference to FIG. 9, FIG. 9 is a schematic diagram illustrating a display device according to an eighth preferred embodiment of the present invention. The display device 110 of this embodiment is a touch-input display panel. Consequently, in addition to the gate lines 34, the data lines 36 and the data signal links 38, the display device 110 further includes a plurality of read-out lines 46 disposed in the display region 32D of the substrate 32 and substantially parallel to the data lines 36, and a plurality of read-out signal links 48 electrically connected with read-out lines 46 respectively and substantially parallel to the data signal links 38. The read-out lines 46 may receive the input signals coming from the touch sensor, and the input signals may be delivered to the chip, which is responsible for dealing with the touch input signals, through the read-out links 48. In this embodiment, the data signal links 38 and the read-out links 48 are arranged parallel to each other. Also, the data signal links 38 and the read-out links 48 may be disposed alternately, or arranged in other suitable manner.

Figure 10:
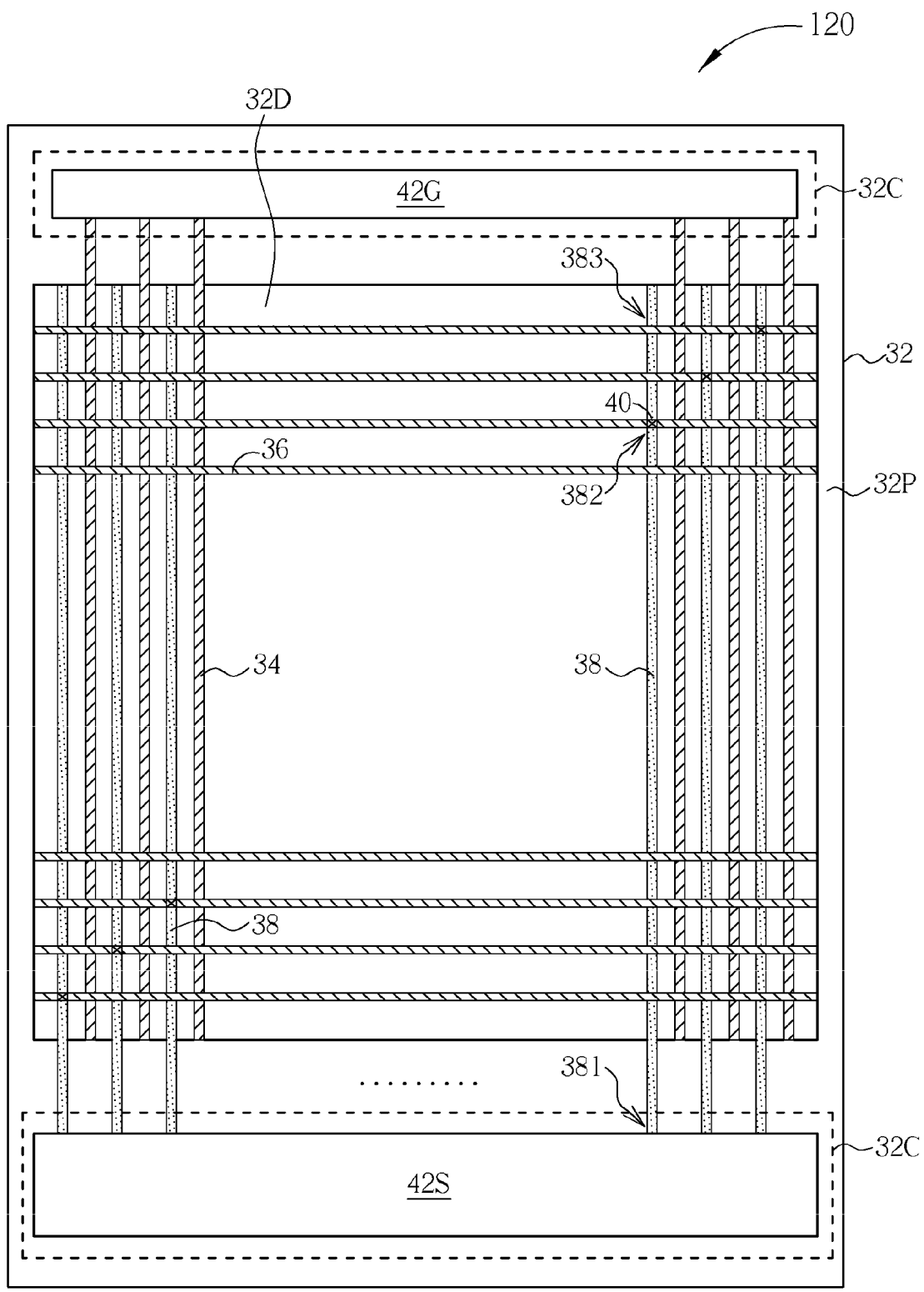
FIG. 10 is a schematic diagram illustrating a display device according to a ninth preferred embodiment of the present invention.

With reference to FIG. 10, FIG. 10 is a schematic diagram illustrating a display device according to a ninth preferred embodiment of the present invention. As illustrated in FIG. 10, differing from each of the aforementioned embodiments, the substrate 32 of the display device 120 of this embodiment includes a plurality of chip bonding regions 32C. For example, two chip bonding regions 32C are disposed in the peripheral region 32P adjacent to the two opposite sides of the display region 32D. In addition, the gate driver 42G and the source driver 42S are coupled to or in different chip bonding regions 32C respectively. Moreover, the data signal links 38, the data lines 36 and the gate lines 34 may be arranged in the manner disclosed in each of the aforementioned embodiments or arranged in other proper manners.

Figure 11:
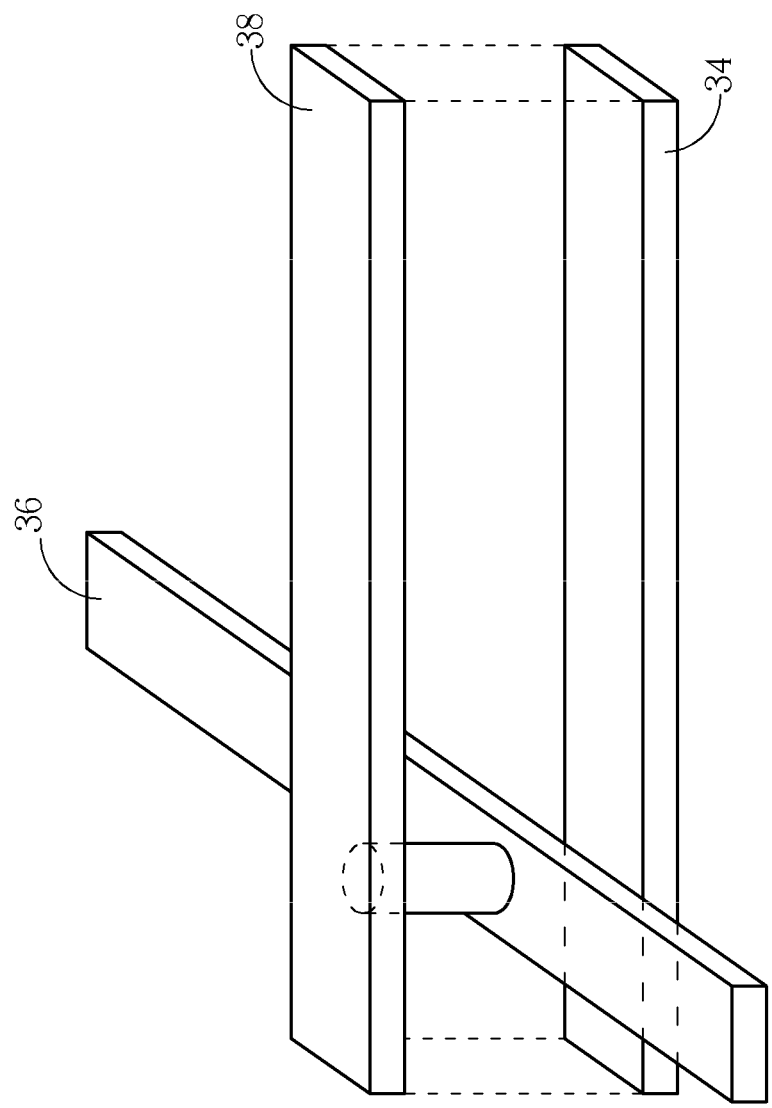
FIG. 11 is a schematic diagram illustrating the data signal links and the gate lines of the display device formed in different metal layers according to another embodiment of the present invention.

In each of the aforementioned embodiments, the data signal links 38 and the gate lines 34 are formed in the same metal layer such as first metal layer (metal 1, M1) but not limited. The data signal links 38 and the gate lines 34 may also be formed in different metal layers. With reference to FIG. 11, FIG. 11 is a schematic diagram illustrating the data signal links and the gate lines of the display device formed in different metal layers according to another embodiment of the present invention. As illustrated in FIG. 11, the gate line 34 may be formed in the first metal layer, the data line 36 may be formed in the second metal layer (metal 2, M2), and the data signal link 38 may be formed in the third metal layer (metal 3, M3), but not limited. Since the data signal links 38 and the gate lines 34 are formed in different metal layers, the data signal links 38 may overlap with the gate lines 34 so as to improve the aperture ratio.

In summary, the present invention utilizes the data signal links disposed in the display region for electrically connecting the source driver and the data lines, and therefore external conducting lines are not required to be disposed in the peripheral region for delivering data signals to the data lines. As a result, the edge area of the display device may be minimized so as to meet the demand for specifications of the thin edge design. In addition, the present invention utilizes the extension lines of the data signal links and rearranges the data signal links and the contact vias of the data lines so as to equalize the loading effect of the display device. Consequently, the display quality may be improved.

Those skilled in the art will readily observe that numerous modifications and alterations of the device and method may be made while retaining the teachings of the invention.

What is claimed is:
1. A display device, comprising:
a substrate having a display region and a peripheral region surrounding the display region;
a plurality of gate lines disposed in the display region of the substrate;
a plurality of data lines disposed in the display region of the substrate;
a plurality of data signal links disposed in the display region of the substrate, wherein each of the data signal links is disposed between the adjacent gate lines respectively; and
a plurality of contact vias, wherein each of the contact vias is disposed between each of the data signal links and a corresponding data line respectively and wherein each of the data signal links is electrically connected with the corresponding data line respectively;
wherein the gate lines, the data lines and the data signal links are all disposed on the same surface of the substrate.
2. The display device of claim 1, wherein two adjacent data lines are electrically connected with two adjacent data signal links, respectively.
3. The display device of claim 1, wherein two adjacent data lines are electrically connected with two non-adjacent data signal links, respectively.

4. The display device of claim 1, wherein the substrate further has a chip bonding region in the peripheral region of the substrate.

5. The display device of claim 4, further comprising at least a chip driver disposed in the chip bonding region.

6. The display device of claim 5, wherein the chip driver comprises:
   at least a gate driver electrically connected with the gate lines; and
   at least a source driver electrically connected with the data signal links.

7. The display device of claim 4, wherein each of the data signal links has a first terminal extending to the chip bonding region and a second terminal connected with each of the corresponding contact vias.

8. The display device of claim 7, wherein each of the data signal links further has an extension line extending from the second terminal of each of the data signal links to the other direction opposite to the chip bonding region, and lengths of the data signal links are substantially identical.

9. The display device of claim 8, wherein each of the data signal links intersects the data lines, and each of the data signal links has a same number of intersection points with the data lines.

10. The display device of claim 1, wherein the substrate further has a first chip bonding region and a second chip bonding region in the peripheral region of the substrate, and the display device further comprises:
    at least a gate driver in the first chip bonding region; and
    at least a source driver in the second chip bonding region.

11. The display device of claim 1, wherein a data signal link is disposed between at least parts of two adjacent gate lines.

12. The display device of claim 1, wherein a plurality of data signal links are disposed between at least parts of two adjacent gate lines.

13. The display device of claim 1, further comprising a plurality of dummy data signal links disposed in the display region of the substrate and physically disconnected with the data lines, wherein the dummy data signal links and the data signal links are substantially parallel to each other.

14. The display device of claim 1, further comprising a plurality of read-out lines disposed in the display region of the substrate and substantially parallel to the data lines, and a plurality of read-out links electrically connected with the read-out lines respectively and substantially parallel to the data signal links.

15. The display device of claim 1, wherein the data signal links and the gate lines are formed in a same metal layer.

16. The display device of claim 1, wherein the data signal links and the gate lines are formed in different metal layers.

17. The display device of claim 16, wherein each of the data signal links overlaps with each of the corresponding gate lines.

* * * * *